W. F. HARRINGTON.
CLUTCH.
APPLICATION FILED JAN. 24, 1918.
1,419,849.
Patented June 13, 1922.
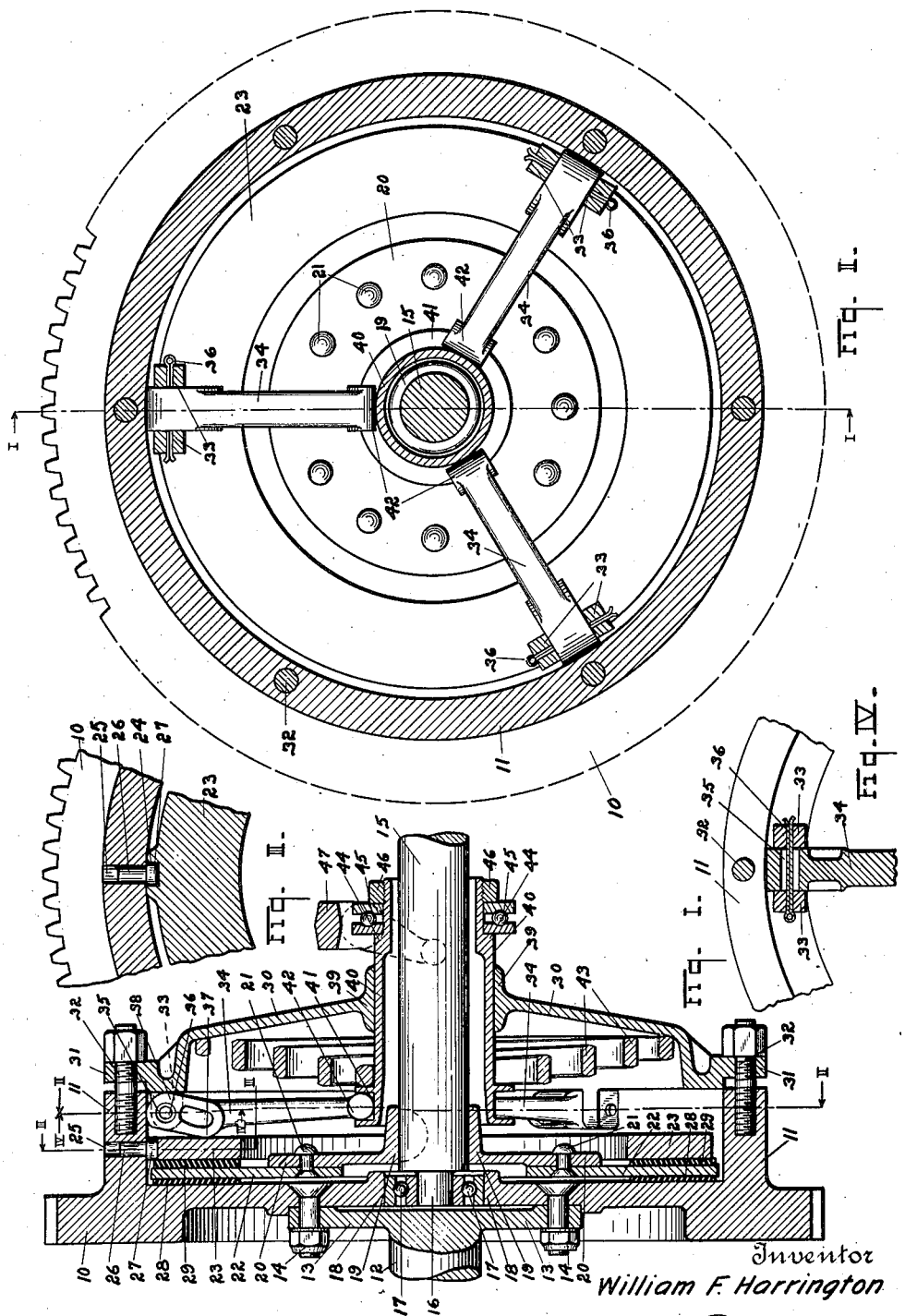
Inventor
William F. Harrington
By Chester H. Braselton
Attorney

UNITED STATES PATENT OFFICE.

WILLIAM F. HARRINGTON, OF TOLEDO, OHIO.

CLUTCH.

1,419,849.  Specification of Letters Patent.  Patented June 13, 1922.

Application filed January 24, 1918. Serial No. 213,524.

*To all whom it may concern:*

Be it known that I, WILLIAM F. HARRINGTON, a subject of the King of Great Britain and Ireland, who have declared my intention to become a citizen of the United States, residing at Toledo, in the county of Lucas and State of Ohio, have invented certain new and useful Improvements in Clutches, of which I declare the following to be a full, clear, and exact description.

This invention relates to improvements in clutches, and particularly to clutches for use in connection with the power transmission mechanism of motor vehicles.

The principal object of this invention is to provide an improved clutch of simple construction and having easily accessible means for adjusting the clutch to compensate for the wear of parts.

A further object of my invention is to provide a clutch construction, in which the adjustments, to compensate for the wear of the parts, are so made and the construction of the clutch is such, that an unequal adjustment on opposite sides of the clutch will not cause the clutch actuating sleeve to bind on the driven shaft.

Further objects and objects relating to economies of manufacture and details of construction, will definitely appear from the detailed description to follow.

I accomplish the objects of my invention by the devices and means described in the following specification. My invention is clearly defined and pointed out in the appended claims.

A structure constituting a preferred embodiment of my invention is illustrated in the accompanying drawings, forming a part of this specification, in which—

Fig. I is a vertical, sectional view taken through a clutch embodying my invention, substantially on the line I—I of Fig. II.

Fig. II is a detail, sectional view, taken substantially on the line II—II of Fig. I.

Fig. III is a detail, fragmentary, sectional view, taken substantially on the line III—III of Fig. I.

Fig. IV is a detail, sectional view, taken substantially on the line IV—IV of Fig. I.

In the drawings, similar reference numerals refer to similar parts throughout the several views, and the sectional views are taken looking in the direction of the little arrows at the ends of the section lines.

Considering the numbered parts of the drawing, I have shown a clutch comprising a driving shaft 12, having a flange 13 at the end thereof, which is bolted to the fly wheel 10 by means of the bolts 14. The fly wheel 10 is provided with a rearwardly extending annular flange 11, which forms a substantially cylindrical recess within the fly wheel, within which the clutch mechanism is housed. Driven shaft 15 has a stub shaft 16 at the forward end thereof, which is journaled in the bearing 17, mounted in the central recess 18, formed in the fly wheel 10.

The hub 19 of a disc 20 is keyed on the driven shaft 15, and a clutch disc 22 is secured to the disc 20 by means of the rivets 21. Clutch ring 23 is mounted within the cylindrical recess formed in the fly wheel 10, said clutch ring being provided with a plurality of pairs of spaced lugs 24, on its periphery, forming notches between said lugs, as clearly shown in Fig. III of the drawing. A plurality of passages 25 extend transversely through the flange 11 of the fly wheel 10, and each of said passages has a pin 26 mounted therein, provided with a head 27, which is mounted between the lugs 24 on the clutch ring 23, so that the clutch ring 23 is mounted so as to turn with the fly wheel 10, while it is permitted a slight axial movement relative to the fly wheel. Rings 28 and 29 of friction material are inserted between the fly wheel 10 and the clutch disc 22, and between the clutch disc 22 and the clutch ring 23.

A cover plate 30 is made adjustable upon the fly wheel without rotation, by means of the nuts on the studs 32, the studs being firmly secured upon the fly wheel, preferably as shown in Figure I. The stud extends loosely through the flange or edge portion 31 of the cover plate and the plate is held in contact with the nuts by the spring 43, which serves to hold the flange portion 31 in spaced relation with the fly wheel. A plurality of pairs of forwardly projecting ears 33 are formed on the cover plate 30, said ears extending towards the fly wheel a short distance inside of the inner surface of the flange 11, as clearly shown in Fig. I of the drawing. A plurality of levers 34 are mounted within the recess formed in the fly wheel, each of said levers being provided with a transverse enlarged opening 35 through the head thereof, and the head of each of said levers being mounted between the ears of one of the pairs of ears 33. Pin 36 extends through the ears 33 and through the opening 35 in the head of the lever 34. Each lever 34 is provided with a forwardly-projecting nose 37, which engages the clutch ring 23, and a rearwardly-projecting cam portion 38, which engages the cover plate 30, as shown in Fig. I of the drawing.

The cover plate 30 is provided with a hub 39, in which the sleeve 40 is slidably mounted, said sleeve being of larger diameter than the driven shaft 15, so that the shaft 15 extends freely through the sleeve 40 without touching. Groove 41 is provided on the forward end of the sleeve 40, which receives the ends 42 of the levers 34. A rearwardly facing shoulder 44 is formed on the rear end of the sleeve 40, and a thrust bearing 45 is mounted on the rear end of said sleeve, abutting said shoulder 44, and held in place by means of the nut 46, threaded on the rear end of the sleeve 40. A clutch yoke 47 is provided with arms, which are adapted to engage the thrust bearing 45, so as to move the sleeve 40 in the hub 39, in which it is slidably mounted. A spring 43 is provided, which is compressed between the cover plate 30 and the shoulder formed by the groove 41 at the forward end of the sleeve 40 whereby the cover plate is constantly held in contact with the adjusting nuts on the studs 32.

From the description of the parts given above, the operation of this device should be very readily understood. In Fig. I the parts are shown in such position that the clutch is set and the driven shaft 15 turns with the driving shaft 12. The spring 43, which presses against the forward end of the sleeve 40, normally forces it inwardly so as to throw the ends 42 of the levers 34 inwardly, causing these levers, which fulcrum on the cam portions 38, to force the nose 37 of each lever against the clutch ring 23, so as to force the clutch ring 23 towards the clutch disc 22, to clamp the parts together and form a driving engagement.

When it is desired to release the clutch, the clutch yoke 47 is operated, thus causing its fingers to press against the thrust bearing 45, so as to move the sleeve 40 rearwardly in the hub 39. This moves the levers 34 so as to withdraw the pressure of the nose 37 of each lever against the ring 23, and allows the clutch ring 23 and the fly wheel 10 to turn independently of the clutch disc 22, which is connected to the driven shaft.

In order to compensate for wear of the parts, the parts may be adjusted by means of the nuts on the screws 32, which bring the cover plate 30 closer to the fly wheel 10, thus adjusting the fulcrums of the levers 34 towards and away from the fly wheel 10, so as to vary the pressure exerted by the levers 34 upon the clutch ring 23. It will be noted that the sleeve 40, which slides back and forth in order to operate the levers, is not mounted upon the driven shaft 15, as is usual, but is mounted in the hub 39 of the cover plate 30, so that, if the opposite sides of the cover plate 30 are not adjusted equally, it will not cause the sleeve 40 to bind upon the shaft 15.

It will be observed that I have provided very simple and easily accessible means for adjusting the parts of the clutch to compensate for wear and I have also provided means such that this adjustment does not need to be accurately made, in view of the fact that a lack of accurate adjusting on the opposite parts of the clutch will not cause the moving parts to bind. The working parts of the clutch are entirely enclosed, and protected, while they are, at the same time, very easily accessible in case of inspection, repair or adjustment.

I have found that the particular embodiment of my invention, here shown and described, is susceptible of considerable variation without departing from the spirit thereof, and, therefore, I desire to claim my invention broadly, as well as specifically, as indicated by the appended claims.

Having thus described my invention what I claim as new and desire to secure by Letters Patent, is:

1. A device of the class described, comprising the combination of a fly wheel, provided with a rearwardly extending annular flange, a driven shaft, a clutch ring carried by said fly wheel and movable axially thereof, a clutch disc carried by said shaft and non-rotatable relative thereto, said disc having a portion interposed between said ring and said fly wheel, a cover plate slidably mounted on the flange of said fly wheel, means for adjusting said plate toward and away from said fly wheel, a plurality of levers fulcrumed on and within said plate and engaging said ring, a sleeve slidably mounted in said cover plate and engaging the inner ends of said levers, said driven shaft extending within said sleeve, and means for actuating said sleeve.

2. In a clutch, the combination with a driving member, a member to be driven, a fly wheel connected to said driving member, a plurality of members projecting from the fly wheel, a cover plate slidably mounted upon said projecting members, means for adjusting the cover plate upon said members, a sleeve slidable upon the cover plate, a spring interposed between said sleeve and cover plate, levers fulcrumed upon the cover plate and connected with said sleeve and a clutch member actuated by said levers for connecting the fly wheel to the member to be driven.

3. In a clutch, the combination with a fly wheel, a cover plate upon the fly wheel, studs secured to the fly wheel and projecting loosely through the cover plate with nuts on their free ends for effecting adjustment of the cover plate relatively to the fly wheel, a sleeve mounted upon the cover plate, a spring interposed between the cover plate and sleeve and adapted to hold the plate in engagement with said nuts, levers fulcrumed upon the cover plate, a driven member, a clutch ring adapted to be actuated by said levers, a disk upon said driven member interposed between said fly wheel and said clutch ring, and means for actuating said sleeve.

4. In a clutch the combination of a flywheel member, a member mounted to rotate therewith and to have axial movement relative thereto, a driven shaft having a disk between said fly-wheel member and said second member, a cover plate, a plurality of spaced threaded means for securing said plate to said fly-wheel member in various positions of axial adjustment, levers engaging said second member and said cover plate, means extending through said cover plate for operating said levers and a return spring for said levers within said cover plate and engaging the inner face thereof.

In testimony whereof, I affix my signature.

WILLIAM F. HARRINGTON.